US005177693A

United States Patent [19]

Wada et al.

[11] Patent Number: 5,177,693

[45] Date of Patent: Jan. 5, 1993

[54] AUTOMATIC SOLUTION MIXING APPARATUS

[75] Inventors: Atsuki Wada, Uji; Nobuaki Aoki, Katano; Koichi Sato, Neyagawa, all of Japan

[73] Assignee: Kurashiki Boseki Kabushiki Kaisha, Okayama, Japan

[21] Appl. No.: 593,013

[22] Filed: Oct. 4, 1990

[30] Foreign Application Priority Data

Oct. 4, 1989 [JP] Japan ..................... 1-259295

[51] Int. Cl.[5] ..................... G06F 15/46; B01F 15/04

[52] U.S. Cl. ..................... 364/502; 73/864.16; 417/403

[58] Field of Search ............... 364/500, 502, 479, 510, 364/140; 73/863.31, 863.33, 863.54, 863.83, 864.13, 864.16, 864.17, 864.18; 222/56; 417/17, 403

[56] References Cited

U.S. PATENT DOCUMENTS 2,646,751 7/1953 Erickson .
3,765,605 10/1973 Gusmer et al. .
3,776,252 12/1973 Wilcox ..................... 417/403 X
3,890,064 6/1975 Boehringer et al. ............ 417/403 X
3,901,408 8/1975 Boden et al. .
3,923,428 12/1975 Clark et al. .
4,145,165 3/1979 Perkins et al. .
4,326,940 4/1982 Eckles et al. ................. 364/500 X
4,333,356 6/1982 Bartels et al. ................ 364/502 X
4,450,574 5/1984 Schwartz ..................... 364/502 X
4,494,677 1/1985 Falcoff ..................... 73/864.16 X
4,523,484 6/1985 Kadota et al. .............. 73/864.16 X
4,527,954 7/1985 Murali et al. ................ 417/403 X
4,581,704 4/1986 Mitsukawa ..................... 364/479
4,648,043 3/1987 O'Leary ..................... 364/502 X
4,671,892 6/1987 Bereiter ..................... 364/500 X
4,919,597 4/1990 Kistner ..................... 417/403
4,953,075 8/1990 Nau et al. ..................... 364/140
5,013,198 5/1991 Schultz ..................... 417/403 X
5,014,211 5/1991 Turner et al. ................ 364/502 X
5,027,267 6/1991 Pitts et al. ................... 364/502 X

FOREIGN PATENT DOCUMENTS 2399008 2/1979 France .
0165098 12/1985 France .
2-26980 1/1990 Japan .
2059516 4/1981 United Kingdom .

OTHER PUBLICATIONS

Abstract of Japanese Patent No. 1275796 registered Jul. 31, 1985.
Abstract of Japanese Patent Publication No. 1-48541 published Oct. 19, 1989.
Abstract of Japanese Patent No. 1425138 registered Feb. 15, 1988.
Abstract of Japanese Utility Model No. 1624396 registered Jan. 31, 1986.
Abstract of Japanese Patent Publication No. 1-53092 published Nov. 13, 1989.

*Primary Examiner*—Kevin J. Teska
*Attorney, Agent, or Firm*—Wenderoth, Lind & Ponack

[57] ABSTRACT

An automatic solution mixing apparatus is provided with a plurality of solution distributors located on opposite sides of a common base plate supported on a supporting block. The support block is movable in opposite directions. Pistons of the solution distributors are connected to the common base plate so that dual solution mixing operations can be performed by the solution distributors with a high degree of accuracy. Moreover, a stepping motor is utilized as a driving motor, and the operation of the stepping motor can be controlled by controlling the number of pulses supplied to the driving motor without using a rotaty encoder.

3 Claims, 5 Drawing Sheets

AUTOMATIC SOLUTION MIXING APPARATUS

BACKGROUND OF THE INVENTION

1. Field of the Invention

The present invention relates to an automatic solution mixing apparatus for use with dying, developing, etching solutions and the like.

2. Description of the Prior Art

One of the present inventors has previously proposed an automatic solution mixing apparatus in Japanese Patent Laid Open Application No. 026980/1990. The automatic solution mixing apparatus disclosed in the above-mentioned patent application comprises, as shown in FIG. 1, a plurality of solution distributors 1-1, 1-2, . . . , 1-n (hereinafter represented by the solution distributors 1) which suction and discharge solutions by the reciprocal movement of pistons 1-1*b*, 1-2*b*, . . . , 1-*nb* (hereinafter represented by 1-*b*) inserted in cylinders 1-1*a*, 1-2*a*, . . . , 1-*na* (hereinafter represented by 1-*a*). The solution distributors are arranged in a row and are respectively connected to three-way solenoid valves 3-1, 3-2, . . . , 3-*n* (hereinafter represented by three-way solenoid valves 3) through common ports (COM) thereof. The three-way solenoid valves 3 are connected to solution tanks (not shown) through solution intake pipes 15-1, 15-2, . . . , 15-*n*, respectively, for receiving solutions from the solution tanks. Also, the three-way solenoid valves 3 are connected to a solution receiver 5 through injection pipes 2-1, 2-2, . . . , 2-n, respectively, for discharging solutions from the solution distributors 1 to the solution receiver 5.

The pistons 1-*b* of the solution distributors 1 are respectively coupled through couplings 6-1, 6-2, . . . , 6-n to an actuating arm 7 for driving all of the pistons with the same stroke in the same direction. The movement of the arm 7 in the direction as indicated with an arrow A, i.e., back and forth movement, is performed by the normal and reverse rotation of a driving motor 8, and the amount of the back and forth movement is controlled by the number of pulses of the pulse signal fed from a rotary encoder 14 which detects the number of revolutions of the motor 8.

Accordingly, since the back and forth movement of the actuating arm 7 corresponds to that of the pistons 1-*b*, the amount of movement of the pistons 1-*b* can be controlled by controlling the amount of the back and forth movement of the arm 7, i.e., the number of pulses fed from the rotary encoder 14. Moreover, since the amount of movement of the pistons 1-*b* corresponds to the amount of the solution discharged from the distributors 1, by selecting the above-mentioned number of pulses per unit discharge amount in advance, the amount of solution discharged from the cylinders 1-*a* can be controlled.

The operation of such an automatic solution mixing apparatus will now be hereinafter described. In the first step, with the three-way solenoid valves 3 having their valve passages opened to the solution tanks, the driving motor 8 is so operated as to move the pistons 1-*b* in a direction of extending the pistons from the cylinders 1-*a*, i.e., to move the actuating arm 7 backward. Accordingly, the solution is suctioned from the solution tank into each distributor 1 so as to fill the same.

The number of pulses corresponding to the amount of solution to be discharged from each distributor 1 is then set in a control section (not shown), so that the control section will control the operation of the driving motor 8 based upon the number of the above-mentioned set pulses and the number of the pulses supplied from the encoder 14.

Subsequently, the driving motor 8 is rotated to move the actuating arm 7 forward, i.e., to retract the pistons 1-*b* into the cylinders 1-*a* to eject air bubbles therefrom, and thereafter perform an operation for mixing a plurality of solutions. In the solution mixing operation, the solutions are discharged in a manner of increasing the amount of solutions discharged from the distributors 1, i.e., increasing the number of the pulses set in the control section, and the control section operates the driving motor 8 to move the actuating arm 7 forward until the discharged amount of the solution reaches specified amount of discharge for each distributor 1 set in the control section. For the distributor 1 in which the discharge of a desired amount of solution has been completed, the three-way solenoid valve 3 located on the discharge side of the cylinder is opened to the solution tank and the solution remaining in the cylinder 1-*a* (hereinafter called the residual solution) is ejected into the solution tank. This operation is repeated for every solution distributor 1 to mix the solutions.

Although the automatic solution mixing apparatus described above is capable of mixing many kinds of solutions accurately, the solution distributors 1 must be arranged in a row to accommodate a driving gear including the actuating arm 7, driving motor 8 and so on behind the distributors 1, and the number of the solution distributors 1 connected to the driving gear is limited because of the limited length of the actuating arm 7. Therefore, when a large number of solution distributors 1 are required, a plurality of sets of the driving gears and the solution distributors 1 have to be provided, which requires the automatic solution mixing apparatus to be made large.

SUMMARY OF THE INVENTION

It is an object of the present invention to eliminate such a problem as mentioned above and to provide an automatic solution mixing apparatus which may be provided with a larger number of solution distributors without making the size thereof large and which is capable of mixing the solutions accurately.

According to a first aspect of the present invention, the automatic solution mixing apparatus comprises: one or more pairs of solution distributors for suctioning solutions into their cylinders and discharging the solutions therefrom by the movement of pistons in the cylinders, the distributors of each pair being substantially disposed face-to-face each with their pistons extending in opposite directions; a piston connecting mechanism for connecting both pistons of each pair of distributors in such a way that the movement of the pistons in the cylinders located on one side of the apparatus is opposite to that of the pistons in the cylinders located on the other side; and piston driving means for driving the pistons to suction the solutions into the solution distributors and discharge a predetermined amount of solutions therefrom.

According to another aspect of the present invention, the automatic solution mixing apparatus comprises: one or more pairs of solution distributors for suctioning solutions into their cylinders and discharging the solutions therefrom by the movement of pistons in the cylinders, the distributors of each pair being substantially disposed face-to-face with their pistons extending in opposite directions: a plurality of pairs of solution tanks corresponding to the respective solution distributors for containing ingredient solutions to be mixed: one or more pairs of solution receivers for containing mixed solutions: three-way solenoid valves for selectively placing the solution distributors in communication with the solution tanks or with the solution receivers depending on a control signal issued thereto: piston connecting means for connecting the pistons in each pair of distributors in such a way that the movement of the pistons in the cylinders located on one side of the apparatus is equal and opposite to that of the pistons in the cylinders located on the other side: piston driving means for driving the piston connecting means to suction the solutions into the solution distributors and to discharge a predetermined amount of solutions therefrom: solenoid valve control means for selectively feeding signals to the three-way solenoid valves to open the valve passages of the three-way solenoid valves to a solution tank and to switch over the valve passages so as to be open to the solution receivers: calculation means for calculating the quantity of solutions to be discharged into the receivers from each of the distributors: driving motor control means for selectively feeding signals to actuate the piston driving means: and control means for controlling the operation of the solenoid valve control means and the driving motor control means based on calculations made by said calculation means.

As mentioned above, the piston connecting means connects the pistons of the solution distributors in such a manner that the movement of the pistons of each distributor on one side of the apparatus is equal and opposite to that of the pistons of each distributor on the other side of the apparatus. The piston driving means reciprocates the piston connecting means over a distance by which the pistons can be moved within the stroke of the distributors. In this way, when those pistons of a group of solution distributors on one side of the apparatus, which face a group of solution distributors on the other side, are retracted into their cylinders, for example, those pistons of the group of the solution distributors on the other side will be extended from their cylinders. And when the situation is reversed, the respective groups of the solution distributors will then be operated in reverse. Thus, the automatic solution mixing apparatus according to the present invention will perform the solution mixing operation by operating at least two groups of solution distributors in one operation in which the distributors of one group suction solutions while the distributors of the other group discharge solutions. As a result, a solution mixing operation is effected accurately without the need for a large automatic solution mixing apparatus.

The present invention together with further objects and advantages thereof may best be understood by referring to the following detailed description, taken in conjunction with the accompanying drawings.

DETAILED DESCRIPTION OF THE PREFERRED EMBODIMENTS

Figure 2:
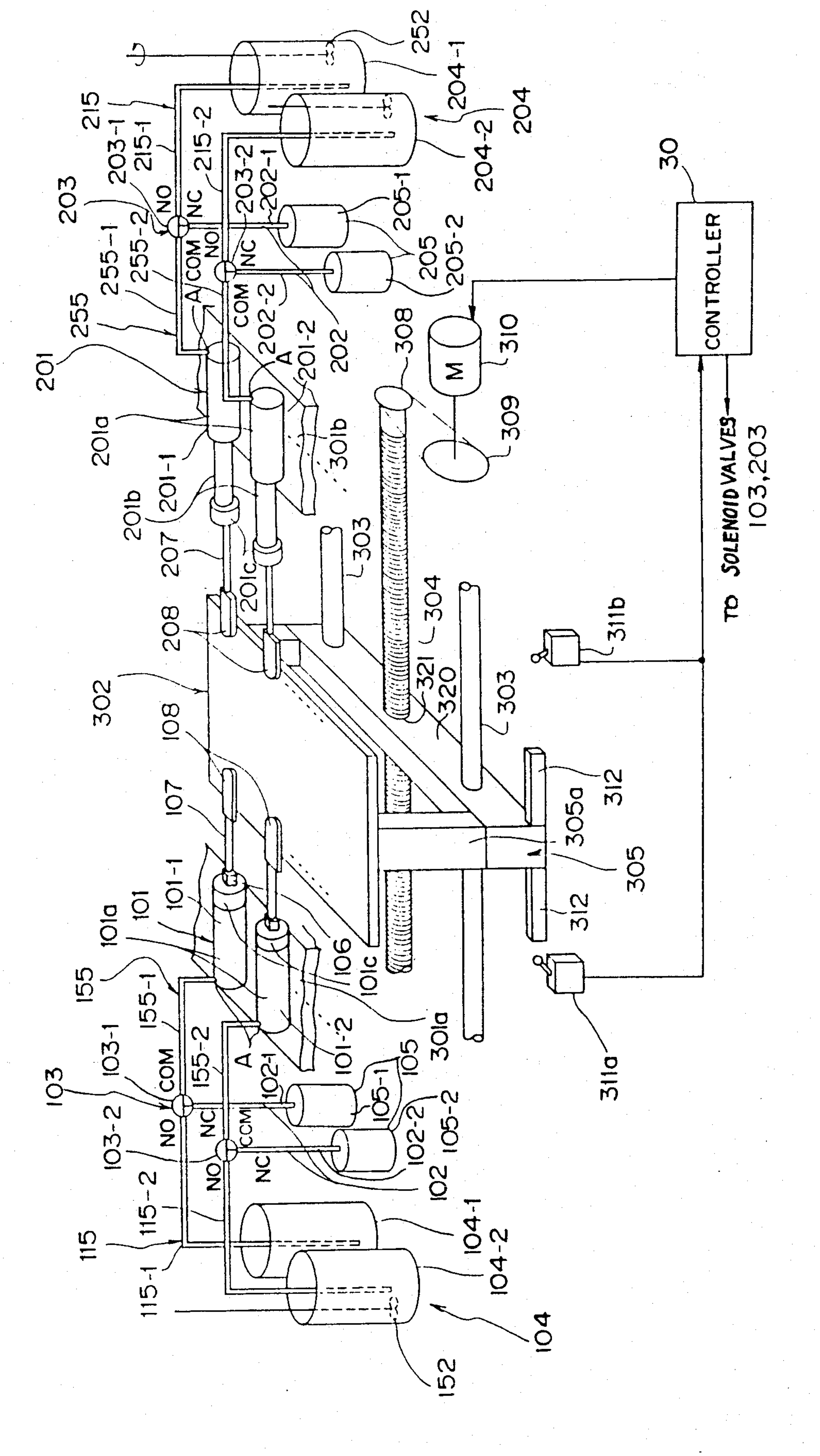
FIG. 2 is a perspective view of an embodiment of an automatic solution mixing apparatus according to the present invention.
Figure 3:
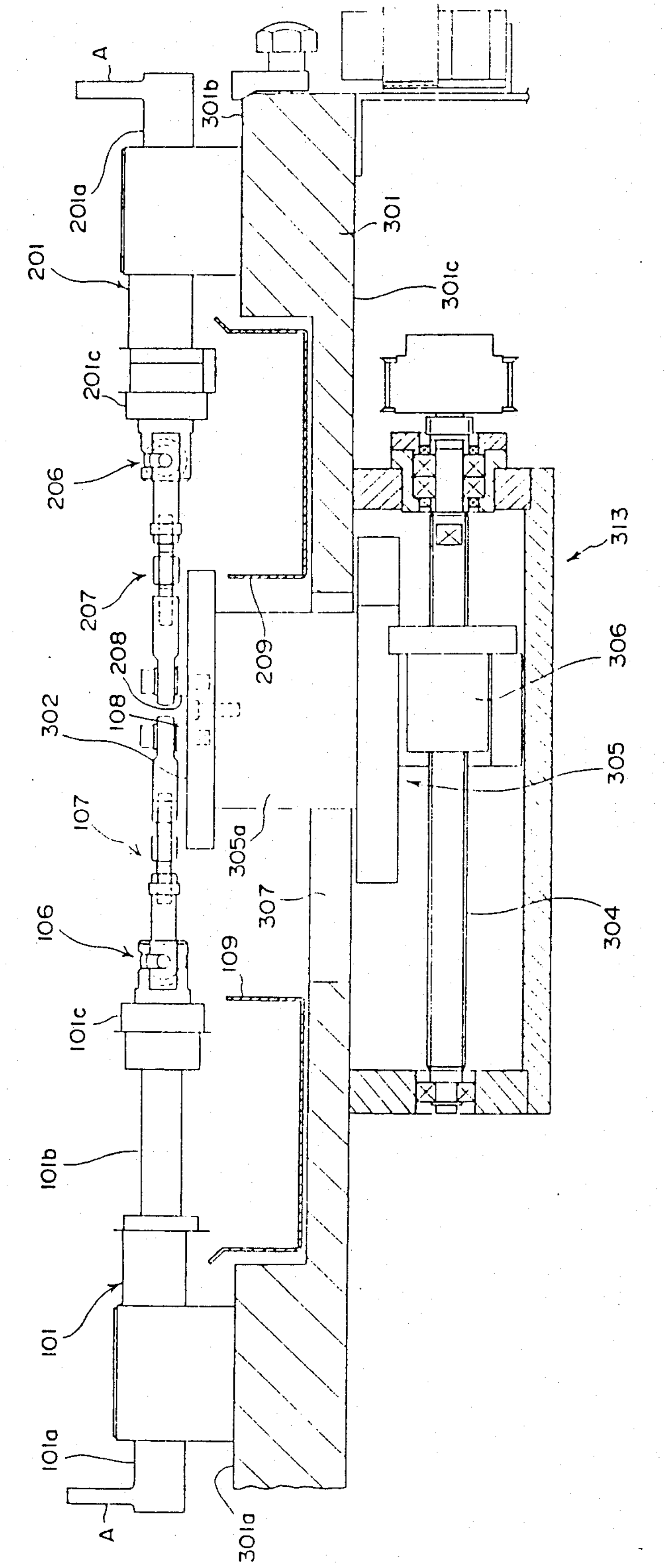
FIG. 3 is a partial cross-sectional view of a main portion of the apparatus shown in FIG. 2.

In FIGS. 2 and 3 depicting one embodiment of an automatic solution mixing apparatus according to the present invention, a plurality of groups of solution distributors 101-1, 101-2, . . ., **101-*n* and 201-*n*, 201-2, . . ., 201-*n* suction and discharge solutions by the backward and forward movement of their respective pistons. The cylinders in each such group are disposed in parallel and are spaced apart appropriately in the longitudinal direction of a pair of flat bases 301*a* and 301*b*, respectively, which extend parallel to each other so that the groups of pistons 107 and 207 face each other in coaxial alignment, the cylinders being mounted to the bases in a horizontal state. It is to be noted that the respective solution distributors fixed on the bases 301*a* and 301*b* may be referred to merely as the solution distributors 101 and 201**, respectively.

The solution distributors 101 and 201 mentioned above comprise the cylinders **101*a* and 201*a*, and pistons 101*b* and 201*b* reciprocating in these cylinders. The pistons 101*b* and 201*b* of the solution distributors 101 and 201 are respectively connected with a common movable base plate 302 through connecting rods 107 and 207. With this construction, the solution distributors 101 discharge solutions and the solution distributors 201 suction the same when the common base plate 302 is moved to the left in the figures, whereas the solution distributors 201 discharge solutions and the solution distributors 101 suction the same when the common base plate 302 is moved to the right in the figures. Each of the solution distributors 101 and 201 has a solution intake/discharge port A directed vertically from the closed end of the cylinders 101*a* and 201*a*, respectively. Three-way solenoid valves 103-1, 103-2, . . . , 103-*n* (represented by the valves 103 hereinafter) are respectively connected to the solution intake/discharge ports A of the distributors 101 through intake/discharge pipes 155-1, 155-2, . . . , 155-*n* (represented by pipes 155 hereinafter). Similarly, three-way solenoid valves 203-1, 203-2, . . . , 203-*n* (represented by valves 203 hereinafter) are respectively connected to the solution intake/discharge ports A of the distributors 201 through intake/discharge pipes 255-1, 255-2, . . . , 255-*n* (represented by pipes 255 hereinafter). Each of the three-way solenoid valves 103 has a normally open port (NO), common port (COM) and normally closed port (NC), wherein the normally open ports NO are respectively connected to solution tanks 104-1, 104-2, . . . , 104-*n* (represented by solution tanks 104 hereinafter) through solution pipes 115-1, 115-2, . . . , 115-*n* (represented by solution pipes 115 hereinafter), and the common ports COM are respectively connected to the cylinders 101*a* through intake/discharge pipes 155, and the normally closed ports NC are respectively connected to solution receivers 105-1, 105-2, . . . , 105-*n* (represented by receivers 105 hereinafter) through injection pipes 102-1, 102-2, . . . , 102-*n* (represented by injection pipes 102 hereinafter). When the solenoid of each valve is energized (turned on), the passage (COM-NC) will open to place the injection pipes 102 associated with the respective receivers 105 in communication with the solution distributors 101, whereas when the solenoid of the valve is de-energized (turned off), the passage (COM-NO) will be open to place the pipes 115 associated with the tanks 104 in communication with the solution distributors 101**.

Similarly, each of the three-way solenoid valves 203 has the same construction as those of the three-way solenoid valves 103.

Figure 1:
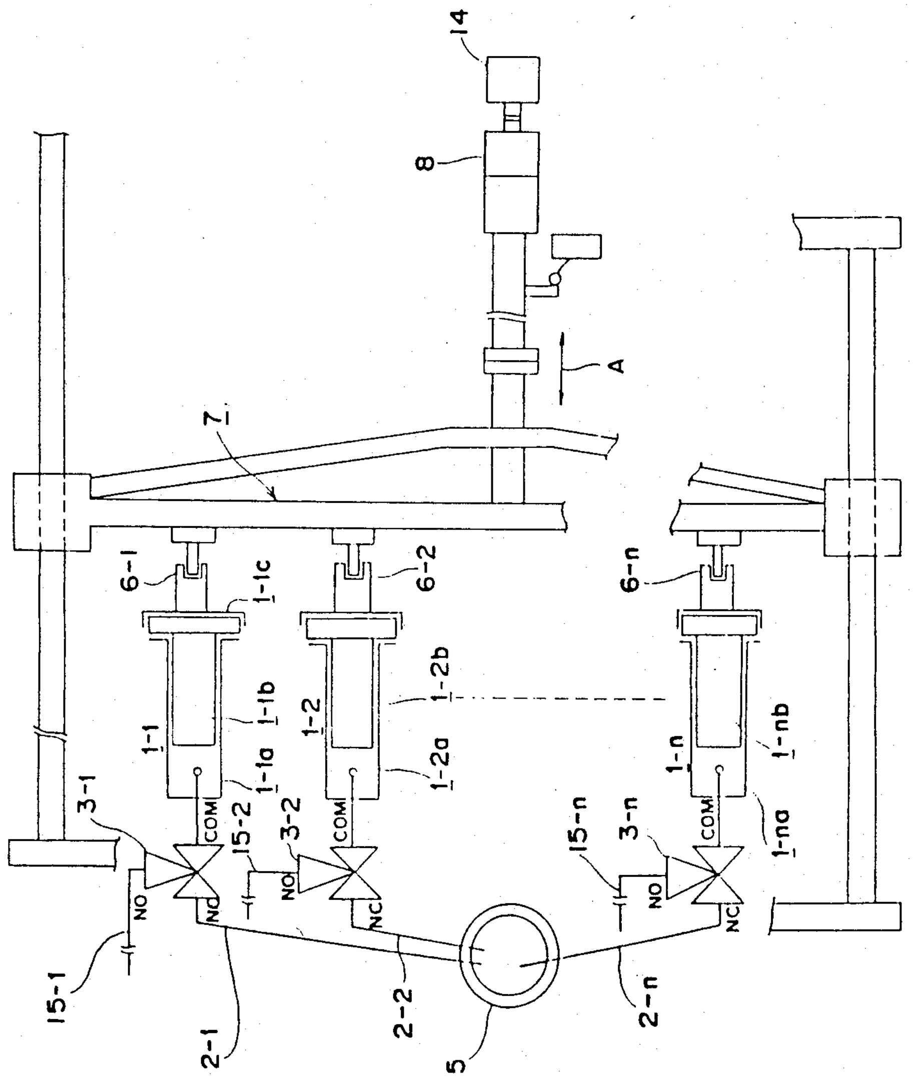
Fig. 1 (PRIOR ART)
FIG. 1 is a schematic diagram of a conventional automatic solution mixing apparatus.

In each of the tanks 104 (204), there is provided an agitator 152 (252) which agitates a condensed solution contained in the tank. The receivers 105 (205) are respectively mounted on a turntable or belt conveyer (not shown) so that they can be moved into alignment with the nozzles of the injection pipes 102 (202). For example, the first receiver 105 receives a desired amount of the first solution through the injection pipe 102-1 of the solution distributor 101-1, and this receiver 105-1 is moved to the second position corresponding to the injection pipe 102-2 of the solution distributor 101-2 to receive a desired amount of the second solution therefrom. In this way, i.e., by moving the receivers to the injection pipes of desired solution distributors so as to receive their individual solutions, the solutions are mixed. Although, in this embodiment shown in FIG. 2, the solution distributors 101 (201) are individually provided with solution receivers 105 (205) connected thereto for receiving solutions, a pair of solution receivers may be provided as shown in FIG. 1; in other words, one solution receiver is provided in association with the solution distributors 101 for receiving the solutions injected through the respective injection pipes 102 and the other solution receiver is similarly provided in association with the solution distributors 201.

Moreover, although respective ingredient solution tanks 104 (204) are provided for each of the solution distributors 101 (201), there may be provided a single ingredient solution tank for receiving solutions fed from a plurality of solution distributors 101 (201) through a plurality of solution pipes 115 (215).

Figure 4:
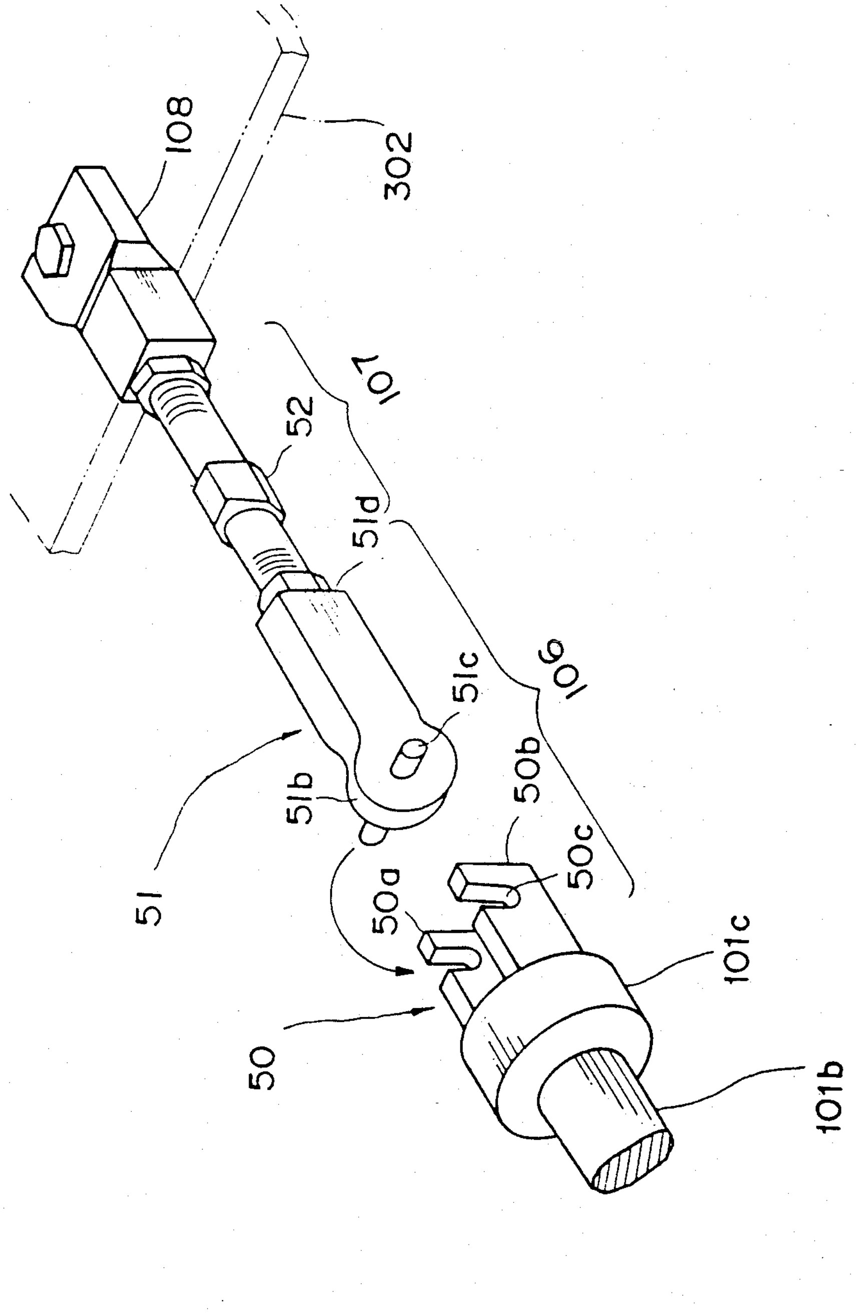
FIG. 4 is a perspective view of a coupling portion of the apparatus shown in FIG. 2.

As shown in FIGS. 3 and 4, metal rings **101*c* (201*c*) are mounted on the end portions of the piston 101*b* (201*b*), and coupling mechanisms 106 (206) are provided for coupling the metal rings 101*c* (201*c*) with the connecting rods 107 (207) which are fixed with the common base plate 302 by rod linkage metal fittings 108 (208). It is noted that, although FIG. 4 shows these parts only on the side of the solution distributors 101, their arrangement is identical with that of those on the side of the solution distributors 201** and the explanation thereof is omitted for brevity.

Each coupling 106 includes a forked "U"-member 50 fixed on the end surface of the metal ring **101*c* and a joint member 51 connected to the connecting rod 107. The forked member 50 comprises two arms 50*a* and 50*b* appropriately spaced apart from each other, each having an oval recess 50*c* having its longer axis running perpendicularly to the longitudinal direction of each of the arms 50*a* and 50*b* and open at one end thereof. The joint member 51 has a flat connecting plate 51*b* which is removably inserted in the space between the arm plates 50*a* and 50*b* and is attached thereto. The connecting plate 51*b* of the joint member 51 has a cylindrical stem rod 51*c* extending perpendicularly through the center of the connecting plate 51*b* and fixed thereto. The cylindrical stem rod 51*c* is slidingly movable in close contact with the surfaces defining recesses 50*c* in the arm plates 50*a* and 50*b*. That is to say, the forked member 50 and the joint member 51 are engaged with each other in such a way that the connecting plate 51*b* is inserted in the space between the arm plates 50*a* and 50*b* of the forked member 50 with the stem rod 51*c* received in the recesses 50*c*. The coupling mechanism 106 thus constructed is advantageous in that it allows flexibility of the angles that the solution distributors 101 make with respect to the connecting rod 107 fixed to the common base plate 302 through the rod linkage metal fitting 108, thereby facilitating an adjustment of the solution distributors 101. The connecting rod 107 comprises a round bar with threaded ends and a hexagon nut 52 fixed at the intermediate portion thereof and through which the round bar is passed. The connecting rod 107 has one threaded end portion engaged in a threaded hole open at an end surface 51*d* of the joint member 51 opposite to the connecting plate 51*b* and has the other threaded end portion engaged in a threaded hole formed at an end surface of the rod linkage metal fitting 108 fixed on the common base plate 302**.

In this way the piston **101*b* of each of the solution distributors 101 is connected to the common base plate 302 through a coupling mechanism 106 and connecting rod 107. In addition, by turning the hexagon nut 52 fixed on the intermediate portion of the connecting rod 107, the length of the portion of the connecting rod 107 inserted in the joint member 51 and the length of the portion thereof inserted in the rod linkage metal fitting 108 can be adjusted to perform a fine adjustment of the position of the piston 101*b* relative to the cylinder 101*a* of the solution distributor 101**.

As shown in FIGS. 2 and 3, the common base plate 302 is supported by a supporting block 305 which is movable longitudinally in the figures. Through a base member 320 of the supporting block 305, there are provided two guide bars 303 extending horizontally in parallel with an appropriate space therebetween, whereby the supporting block 305 is guided for right-to-left movement in the figures. In the middle portion of the base member 320 there is formed a threaded hole 321 through which a shifting screw 304 in the form of a ball screw is inserted, so that the supporting block 305, i.e., the common base plate 302, can be moved right and left in the figures by rotating the shifting screw 304.

Two posts **305*a* extend vertically at the both ends of the top surface of the supporting block 305, and the common base plate 302 is fixed on the posts 305*a* on the supporting block 305. The rod linkage metal fittings 108 and 208 are fixed face-to-face on the common base plate 302. A plurality of these metal fittings 108 (208) are arranged in positions corresponding to the solution distributors 101 (201) installed on the base 301*a* (301*b*). In this embodiment, a solution distributor 101, connecting rod 107, pair of rod linkage metal fittings 108 and 208, connecting rod 207 and solution distributor 201 are disposed in alignment. Since the common base plate 302 is flat, there is an advantage in that the rod linkage metal fittings 108 (208) can be easily fixed on the base plate 302 and detached therefrom so that parts including the solution distributors 101 (201**) can be easily maintained.

When providing a rod linkage metal fitting which may be freely adjusted relative to the common base plate 302, in addition to the rod linkage metal fitting 108 shown in FIG. 2, the solution distributors can be arranged in four directions and the like. In this case, it is necessary to compensate for the amount of movement of the pistons corresponding to that of the supporting block 305.

At one end of the shifting screw 304 there is provided a pulley 308 which is linked through a belt, for example, with a pulley 309 mounted on a driving shaft of a driving motor 310. The driving motor 310 is a reversible stepping motor whose operating time is controlled by the number of pulses supplied from a controller 30 to be described later.

Thus, by operating the driving motor 310, the shifting screw 304 is rotated so as to move the supporting block 305 and the common base plate 302 right and left along the longitudinal direction of the guide bars 303. The supporting block 305 is moved right and left in the figures in the space between the opposing pistons **101*b* and 201*b* of the solution distributors 101 and 201. In this embodiment, the supporting block 305 is moved longitudinally in an opening 307 formed in a substrate 301 to which the solution distributors 101 and 201** are fixed.

In order to detect the limit positions of the longitudinal movement of the supporting block 305, there are provided limit switches **311*a* and 311*b* on a fixed frame (not shown) for sending signals to stop the rotation of the driving motor 310. And there are provided detection bars 312 protruding from the supporting block 305 in the longitudinal direction for actuating the limit switches 311*a* and 311*b* when the supporting block 305 reaches the specified limit positions thereof. The limit positions are set within a range in which the pistons 101*b* and 201*b* can be moved in the cylinders 101*a* and 201*a* of the solution distributors 101 and 201 fixed on the both sides on the substrate 301**.

In order to lubricate the pistons **101*b* (201*b*) within the cylinders 101*a* (201*a*), lubricant such as water or oil will be dropped from a location above the pistons 101*b* (201*b*) when the pistons are pulled out from the cylinders of the solution distributors 101 (201), and there are provided lubricant receivers 109 and 209 on the substrate 301 for receiving the lubricant. In this embodiment, a shifting unit 313 includes the guide bars 303, shifting screw 304 and supporting block 305 under a lower surface 301*c* of the substrate 301 so as to constitute a unit integrated with the substrate 301**.

In this arrangement as mentioned above, when the supporting block 305 is shifted to the left in the figures for example, the pistons **101*b* will be retracted into the cylinders 101*a* (forward), and at the same time, the pistons 201*b* will be extended from the cylinders 201*a* (backward). When the supporting block 305 is shifted to the right, the pistons 101*b* and 201*b*** are operated in reverse with respect to the operation mentioned above.

Accordingly, when the pistons **101*b* are extended from the cylinders 101*a* for example, since the three-way solenoid valves 103 are opened to the ingredient solution tanks 104, the solution distributors 101 will suction the solution contained in the solution tanks 104 into the cylinders 101*a* through the three-way solenoid valves 103 and intake/discharge ports A. At the same time, the solution distributors 201 will discharge the solution in the cylinders 201*a* through the intake/discharge ports A to the solution receivers 205 under the retraction of the pistons 201*b* into the cylinders 201*a*. Conversely, when the pistons 201*b* are extended from the cylinders 201*a*, since the three-way solenoid valves 203 are opened to the ingredient solution tanks 204, the solution distributors 201 will suction the solution contained in the solution tanks 204 into the cylinders 201*a* through the three-way solenoid valves 203 and intake/discharge ports A. At the same time, the solution distributors 101 will discharge the ingredient solution in the cylinders 101*a* through the intake/discharge ports A under the retraction of the pistons 101*b* into the cylinders 101*a***.

Figure 5:
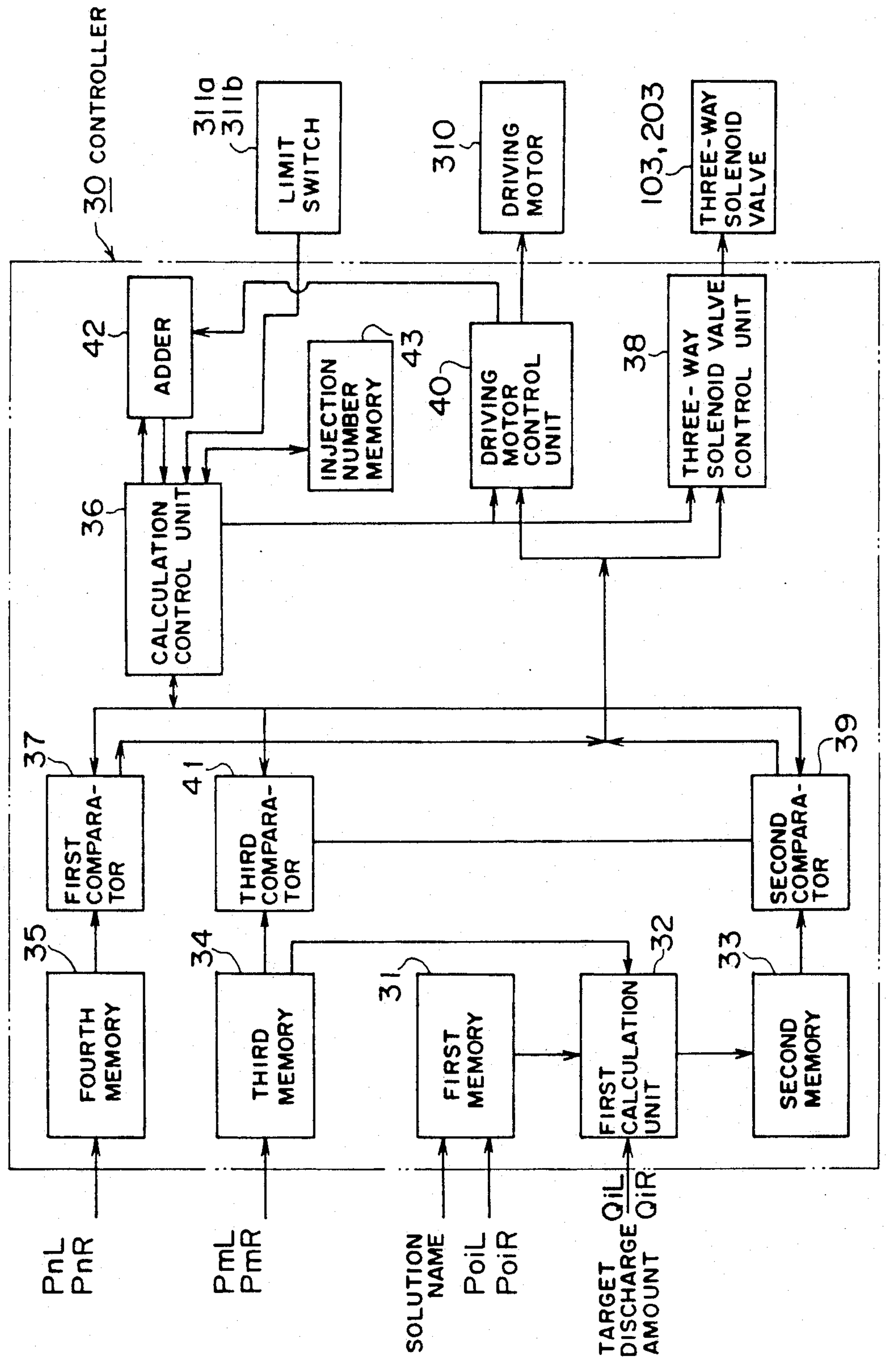
FIG. 5 is a block diagram of an embodiment of a control unit for the automatic solution mixing apparatus according to the present invention.

The operation of this embodiment of the automatic solution mixing apparatus having the structure mentioned above will now be described with reference to FIGS. 2, 3 and 5. To help one understand the operation, those solution distributors for distributing the solutions will be described in terms of the illustrated embodiment in which the distributors are arranged on the right and left sides of the common base plate 302 in FIG. 2. In the discussion, suffixes L and R depict items relating to the solution distributors 101 and 201 on the left and right, respectively.

For arriving at the number of pulses of the signal to be fed to the driving motor 310, the relation between the number of revolutions of the driving motor 310 depending on the number of the pulses supplied to the motor 310 and the amount of the ingredient solution discharged from each of the solution distributors 101 and 201 corresponding to the movement of the supporting block 305 driven by the rotation of the driving motor 310 is previously obtained experimentally, so that the numbers of the pulses per a unit discharge amount of the solution by each of the solution distributors 101 and 201, i.e., P0iL and P0iR (pulses/milliliter) are respectively registered in a first memory 31 in the controller 30 as shown in Table 1.

TABLE 1

| SOLUTION NAME | SOLUTION TANK | DISTRIBUTOR IN USE | NUMBER OF PULSES PER UNIT INTAKE SOLUTION AMOUNT |
|---|---|---|---|
| A1L | 104-1 | 101-1 | P01L |
| A1R | 204-1 | 201-1 | P01R |
| A2L | 104-2 | 101-2 | P02L |
| A2R | 204-2 | 201-2 | P02R |
| . | . | . | . |
| . | . | . | . |
| . | . | . | . |
| AiL | 104-i | 101-i | P0iL |
| AiR | 204-i | 201-i | P0iR |

The numbers of input pulses PmL and PmR corresponding to the largest strokes of each of the respective pistons **101*b* and 201*b* of the solution distributors 101 and 201, i.e., the largest distance over which the pistons 101*b* and 201*b* can be moved from end-to-end in the cylinders 101*a* and 201*a*, are set and registered in a third memory unit 34 in the controller 30. The sums of the content volume of the intake/discharge pipes from the intake/discharge ports A to the three-way solenoid valves, the remaining content volume of the three-way solenoid valves, the content volume of the ingredient solution pipes between the three-way solenoid valves and the solution tanks and some extra content volume for safety are individually obtained for the solution distributors 101 and 201. In connection with the solution distributor having the largest sum among those obtained, the numbers of pulses PnL and PnR to be fed to the driving motor 310 which correspond to the movement amount of the piston required for discharging the solution of the content volume mentioned above are registered in a fourth memory 35 in the controller 30**. The numbers of the pulses PnL and PnR may also be obtained experimentally.

The numbers of pulses PnL and PnR registered in the fourth memory unit 35 are fed to a first comparator unit 37 for comparing the numbers of pulses PnL and PnR with the counted values PiL and PiR fed from an adder 42 to be described later.

When the data of the names of solutions and their respective target injection amounts QiL and QiR are fed to the controller 30, the numbers of pulses P0iL and P0iR per unit discharge amount of the ingredient solution of the solution distributor connected to the solution tank which contains the solution in question are entered in the first memory unit 31, and the numbers of pulses PQiL and PQiR corresponding to the target injection amounts QiL and QiR are calculated in a first calculation unit 32 by the following equations:

$$PQiL = P0iL \times QiL, \text{ and } PQiR = P0iR \times QiR$$

In addition, in the first calculation unit 32, the calculated target numbers of pulses PQiL and PQiR are divided by the produced pulse numbers PmL and PmR respectively corresponding to the largest distances mentioned above for the pistons to be moved, and subsequently, the respective quotients as the numbers of injections nL and nR and their residuals as the numbers of the last injection pulses PqiL and PqiR are registered in the second memory 33 as shown in Table 2. The numbers of injections nL and nR are positive integers 0, 1, 2, . . . and n=0 means the first injection. Accordingly, when the numbers of injections nL and nR are 0, the target pulse numbers PQiL and PQiR become equal to the last injection pulse numbers PqiL and PqiR.

The largest values of the counted numbers of injections nL and nR are registered in an injection number memory unit 43, and the pistons 101*b* and 201*b* of all the solution distributors 101 and 201 perform reciprocal movements that number of times. In Table 2, it is indicated that each of ingredient solutions A3L and A3R is not injected.

TABLE 2

| SOLUTION NAME | SOLUTION TANK | DISTRIBUTOR USED | TARGET PULSE NUMBER | INJECTION TIMES | LAST INJECTION PULSE NUMBER |
|---|---|---|---|---|---|
| A1L | 104-1 | 101-1 | PQiL | 0 | PqiL |
| A1R | 204-1 | 201-1 | PQiR | 2 | PqiR |
| A2L | 104-2 | 101-2 | PQiL | 1 | PqiL |
| A2R | 204-2 | 201-2 | PQiR | 2 | PqiR |
| A3L | 104-3 | 101-3 | — | — | — |
| A3R | 204-3 | 201-3 | — | — | — |
| . | . | . | . | . | . |
| . | . | . | . | . | . |
| . | . | . | . | . | . |
| AiL | 104-i | 101-i | PQiL | nL | PqiL |
| AiR | 204-i | 201-i | PQiR | nR | PqiR |

Moreover, the solution distributors 101 and 201 are moved approximately the same distance, and the diameters thereof may be different from each other.

By increasing the bore of one or more of the cylinders of the solution distributors 101 and 201, large amounts of ingredient solutions can be suctioned and discharged by the same amount of movement of the pistons 101*b* and 201*b*, thereby reducing the period of time required for suctioning and discharging the ingredient solutions. On the other hand, by reducing the bores of the cylinders of the solution distributors 101 and 201, smaller amounts of ingredient solutions can be suctioned and discharged by the same amount of movement of the pistons 101*b* and 201*b*, thereby improving the accuracy of the suctioning or discharging of the solution. That is, since the distance over which the pistons 101*b* and 201*b* are to be moved is fixed, a smaller sectional area of the bores of the cylinders of the solution distributors 101 and 201 enables a rather small amount of solution to be distributed so that a high degree of distribution can be obtained.

Therefore, by selecting a suitable bore for the cylinders of the solution distributors 101 and 201 corresponding to the ingredient solution used and the distribution amount thereof, a desired mixing of solutions can be performed by a smaller number of reciprocal movements of the pistons 101*b* and 201*b*.

Generally speaking, in order to cover a wide range of solution concentrations by plural solution distributors of the same cylinder bore, it is necessary to prepare several concentrations of the ingredient solutions to be suctioned into the solution distributors since the range of the injection amount of the distributors is limited. However, by preparing a plurality of solution distributors having different cylinder bores for ingredient solutions of the same concentration, a wide range in the amounts of solutions discharged can be covered without increasing the number of solution tanks, so that a wide range of solution concentrations can be covered.

Therefore, there is an advantage in that the number of solution mixing operations required for one kind of ingredient solution can be decreased and more kinds of solutions can be used in one automatic solution mixing apparatus.

The automatic solution mixing operation actually performed by each of the solution distributors 101 and 201 will be now described hereinafter for each operating step. In the following description, it is noted that the solution distributors 101 represent all the solution distributors disposed on the left side in FIG. 2, while the solution distributors 201 represent all the solution distributors disposed on the right side.

[1] SUCTION AT THE SOLUTION DISTRIBUTORS 101; DISCHARGE AT THE SOLUTION DISTRIBUTORS 201

When an operation start-up signal is issued to the controller 30, the driving motor 310 is operated (to rotate counterclockwise, for example) so as to move the supporting block 305 to the right in FIGS. 2 and 3. At this time, the three-way solenoid valves 103 are de-energized to open the valve passages COM-NO to the solution tanks 104. Accordingly, the pistons 101*b* of the solution distributors 101 are moved backward according to the right-hand movement of the supporting block 105, namely, the common base plate 302, so that the ingredient solutions in the solution tanks 104 are suctioned and fed into the cylinders 101*a* of the solution distributors 101.

At this time, the three-way solenoid valves 203 at the side of the solution distributors 201 opposing the solution distributors 101 are de-energized to open the valve passages COM-NO to the solution tanks 204. Accordingly, the pistons 201*b* of the solution distributors 201 are moved forward according to the right-hand movement of the common base plate 302, so that the remaining ingredient solutions (air if the solutions are not present) in the cylinders 201*a* are discharged and fed into the solution tanks 204.

The driving motor 310 is rotated to move the supporting block 305 to the right until the detecting bar 312 fixed to the supporting block 305 comes in contact with the limit switch 311*b*. When the supporting block 305 reaches the limit position on the right-hand side and the limit switch 311*b* is operated by the detecting bar 312, a right-hand movement completion signal is transmitted from the limit switch 311*b* to a calculation control unit 36 in the controller 30 Then, the calculation control unit 36 interrupts power supply to the driving motor 310 through a driving motor control unit 40 so as to stop the rotation of the motor 310 and set the movement amount count value Pi of the supporting block 305 stored in the adder 42 to zero. The movement amount count value Pi is a value obtained by counting the number of pulses of the pulse signal fed to the driving motor 310 to control the operation thereof. The calculation control unit 36 sends a signal for setting the number of injections to zero to the injection number memory unit 43.

[2] AIR BUBBLE EJECTION AT THE SOLUTION DISTRIBUTORS 101; SUCTION AT THE SOLUTION DISTRIBUTORS 201

Next, the controller 30 reverses the driving motor 310 (clockwise rotation, for example) through the driving motor control unit 40 so as to move the supporting block 305 to the left. The pulse signal fed to the driving motor 310 is at the same time fed to the adder 42 from the driving motor control unit 40, and the number of pulses fed to the adder 42 is additively accumulated therein. In this case, since all of the three-way solenoid valves 103 associated with the solution distributors 101 are held de-energized, the valve passages are opened to the solution tanks 104. At this time, the three-way solenoid valves 203 of the solution distributors 201 opposing the solution distributors 101 are de-energized with the valve passages opened to the solution tanks 204.

Accordingly, the pistons 201*b* of the solution distributors 201 are backward, in other words, moved extended from the cylinders according to the left-hand movement of the supporting block 305, so that the ingredient solution in the solution tanks 204 are suctioned into the cylinders 201*a* of the respective solution distributors 201.

The count value Pi added in the adder 42 in accordance with the operation of the driving motor 310 is successively fed to the first comparator 37 through the calculation control unit 36, and the first comparator 37 compares the count value Pi with the pulse number PnL fed from the fourth memory unit 35. When the count value Pi becomes equal to the pulse number PnL, the first comparator 37 sends out the signal for stopping the rotation of the driving motor 310 so as to once stop the rotation of the driving motor 310. In addition, the calculation control unit 36 sets the added value added in the adder 42 to zero according to the signal supplied from the first comparator 37.

The purpose of moving the pistons 101*b* of the solution distributors 101 once to the left is to push back all of the air bubbles mingled in the solution distributors 101 to the solution tanks 104 during the solution suction operation so as to ensure that there are no air bubbles present between the intake/discharge ports A of the solution distributors 101 and the three-way solenoid valves 103. Such an air bubble ejection may be performed during the end-to-end movement of the pistons, and the solutions ejected from the cylinders can be either returned to the solution tanks or disposed of. In this case, the ingredient solutions are again supplied to the cylinders 101*a* of the solution distributors 101.

[3] INDIVIDUAL DISTRIBUTION AT THE SOLUTION DISTRIBUTORS 101; SUCTION AT THE SOLUTION DISTRIBUTORS 201

In response to the signal transmitted from the calculation control unit 36, the second comparator unit 39 energizes the three-way solenoid valves 103 associated with one or more solution distributors 101 which are required to discharge the solutions into the receivers 105, based on the data signals fed to the second memory unit 33 from the first calculation unit 32 so as to open the valve passages COM-NC of the three-way solenoid valves 103 to place the solution distributors 101 in communication with the receivers 105. Accordingly, when the pistons 101*b* of the solution distributors 101 are moved forward, that is, when retracted into their cylinders 101*a*, the ingredient solutions in the solution distributors are discharged into the receivers 105.

At this time, the three-way solenoid valves 203 of all of the distributors 201 located on the right, oppositely to the solution distributors 101, are de-energized and the valve passages COM-NO thereof are opened to the solution tanks 204. Accordingly, when the pistons 201*b* of the solution distributors 201 are moved backward according to the left-hand movement of the common base plate 302, the ingredient solutions in the solution tanks 204 are suctioned into the cylinders 201*a* of the solution distributors 201.

Subsequently, the calculation control unit 36 operates the driving motor 310 through the driving motor control unit 40 so as to move the common base plate 302 to the left. Therefore, the ingredient solutions are discharged from the corresponding solution distributors 101 to the receivers 105, and at the same time, the pulse signal supplied to the driving motor 310 is fed to the adder 42, which accumulates the number of pulses and sends the accumulated value to the calculation control unit 36 successively.

The second comparator unit 39 compares the target number of pulses of the solution distributors 101 with the number of pulses supplied from the adder 42. When the smallest value PQiL of the target number of pulses becomes equal to the number of pulses produced from the adder 42, the second comparator unit 39 sends a signal for stopping the rotation of the driving motor 310 temporarily to the driving motor control unit 40. The second comparator unit 39 further de-energizes the three-way solenoid valve 103-*i* connected to the solution distributor 101-*i* corresponding to the target number of pulses PQiL through a three-way solenoid valve control unit 38.

Accordingly, the ingredient solution in the solution distributor 101-*i* is prevented from being discharged to the receiver 105-*i*, and thereafter, the ingredient solution in the solution distributor 101-*i* is discharged to the solution tank 104-*i*.

In this embodiment, although the valve passages of the three-way solenoid valves 103 are switched over after the driving motor 310 has been temporarily stopped, it is also possible to switch over the valve passages of the three-way solenoid valves 103 without temporarily stopping the rotation of the driving motor 310. In this case, the time required for distributing the solution can be shortened.

On the other hand, at this time, since all the three-way solenoid valves 203 of the solution distributors 201 are de-energized, the valve passages COM-NC thereof are opened to the solution tanks 204, and even when the flow of the discharged solution from the three-way solenoid valve 103-*i* of the solution distributor 101-*i* is changed, the pistons 201*b* are moved backward in accordance with the left-hand movement of the supporting block 305 as mentioned above, and the ingredient solutions in the solution tanks 204 are successively suctioned into the cylinders 201*a* of the solution distributors 201.

Subsequently, the calculation control unit 36 operates the driving motor 310 again to move the common base plate 302 to the left. As in the operation mentioned above, the second comparator unit 39 compares the next smallest value PQiL of the target number of pulses with the number of pulses produced from the adder 42. When the next smallest value PQiL is equal to the number of pulses produced from the adder 42, the rotation of the driving motor 310-is temporarily stopped again and the associated three-way solenoid valve 103-*i'* is de-energized.

On this occasion too, since the three-way solenoid valves 203 associated with the solution distributors 201 are de-energized, their valve passages COM-NO are opened to the solution tanks 204. Therefore, even when the flow of the solution in the three-way-solenoid valve 103-*i'* associated with the solution distributor 101-*i'* is changed, the pistons 201*b* are moved backward in accordance with the left-hand movement of the common base plate 302 as mentioned above, and the ingredient solutions in the solution tanks 204 are successively suctioned into the cylinders 201*a* of the solution distributors 201.

In this way, starting from the solution distributor which has attained the solution mixing operation corresponding to the target number of pulses set in the second memory unit 33, the valve passages of the three-way solenoid valves 103 associated with the corresponding solution distributors are switched over so as to be open to the solution tanks 104 and thereby complete the discharge of the solutions into the receivers 105.

[4] DISCHARGE OF REMAINING SOLUTION IN THE SOLUTION DISTRIBUTORS 101; SUCTION AT THE SOLUTION DISTRIBUTORS 201

The third comparator unit 41 compares the number of pulses supplied from the adder 42 with the number of pulses PmL for the largest piston movement of the solution distributor set in the third memory unit 34, and when the pulse numbers are coincident with each other, the rotation of the driving motor 310 for moving the supporting block 305 to the left is stopped and all the three-way solenoid valves 103 associated with the solution distributors 101 are de-energized and the valve passages thereof are switched over to be opened to the solution tanks 104. The number of pulses PmL indicates the number of pulses which corresponds to the amount of movement of the detection bar 312 necessary to actuate the limit switch 311*a* at the left side for sending the detection signal when the pistons 101*b* are completely inserted into the cylinders 101*a* of the solution distributors 101. Therefore, the limit switch 311*a* nay be omitted by using the number of pulses PmL corresponding to the largest amount of movement of the pistons 101*b*.

At this time, the three-way solenoid valves 203 associated with the solution distributors 201 are de-energized and their valve passages COM-NO are opened to the solution tanks 204. Accordingly, the pistons 201*b* of the solution distributors 201 are moved backward in accordance with the left-hand movement of the common base plate 302, and the ingredient solutions in the solution tanks 204 are continuously suctioned into the cylinders 201*a* of the solution distributors 201 until the left-hand limit switch 311*a* is turned on so as to stop the common base plate 302. When the pistons 201*b* reach the backward limit position and the limit switch 311*a* is actuated by the detection bar and sends out the signal for stopping the rotation of the driving motor 310, the number of injections to be stored in the injection number memory unit 43 is replaced with a value that is one less than the current number of pulses stored in the memory unit 43.

[5] SUCTION IN THE SOLUTION DISTRIBUTORS 101; AIR BUBBLE EJECTION, MEASUREMENT AND RETURN AT THE SOLUTION DISTRIBUTORS 201

Next, in the case where the injection number sent out from the injection number memory unit 43 is not zero, the calculation control unit 36 reverses the rotation of the driving motor 310 and operates the driving motor 310 until the right-hand limit switch 311*b* is turned on. In this case, the supporting block 305 does not move from the left end to the right end but moves as described later. Accordingly, since the common base plate 302 connected to the pistons 101*b* of the solution distributors 101, i.e., the supporting block 305, is moved to the right, the ingredient solutions are suctioned from the solution tanks 104 into all of the solution distributors 101. In addition, by turning on the limit switch 311*b* as mentioned above, the calculation control unit 36 sets to zero the count value Pi for the amount of movement of the supporting block 305 to be stored in the adder 42.

The operation from the time when the left-hand limit switch 311*a* is turned on to the time when the right-hand limit switch 311*b* is turned on will be hereinafter described with regard to the solution distributors 201 located at the right side.

[5-1] SUCTION IN THE SOLUTION DISTRIBUTORS 101; AIR BUBBLE EJECTION IN THE SOLUTION DISTRIBUTORS 201

When the limit switch 311*a* is turned on, the pistons 201*b* of the solution distributors 201 are fully extended to the leftmost position with the three-way solenoid valves 203 opened to the solution tanks 204, so that every cylinder 201 is filled with each ingredient solution.

Then the controller 30 reverses the rotation of the driving motor 310 (counterclockwise rotation, for example) to move the supporting block 305 to the right. The pulse signal fed to the driving motor 310 from the driving motor control unit 40 is at the same time fed to the adder 42 and the number of pulses fed to the adder 42 is additively accumulated in the adder 42.

The count value Pi added in the adder 42 is successively fed to the first comparator unit 37 through the calculation control unit 36. The first comparator unit 37 compares the count value Pi with the number of pulses PnR supplied from the fourth memory unit 35. When the count value Pi becomes equal to the number of pulses PnR, the first comparator unit 37 sends out a signal to the driving motor control unit 40 for stopping the rotation of the driving motor 310. Thus, the rotation of the driving motor 310 is temporarily stopped. In addition, in response to the output signal of the first comparator unit 37, the calculation control unit 36 sets the added value in the adder 42 to zero.

The purpose of moving the supporting block 305 temporarily to the right is to push out all the air bubbles mingled in the solution in the solution distributors 201 during the solution suction operation to the solution tanks 204 so as to ensure that there are no air bubbles present between the solution distributors 201 and the three-way solenoid valves 203.

[5-2] SUCTION IN THE SOLUTION DISTRIBUTORS 101: INDIVIDUAL DISTRIBUTION IN THE SOLUTION

DISTRIBUTORS 201

Next, in response to the signal transmitted from the calculation control unit 36, the second comparator unit 39 energizes the three-way solenoid valves 203 associated with the solution distributors 201 required to discharge the solutions into the receivers 205 based on the data supplied to the second memory unit 33 so as to place the solution distributors 201 in communication with the receivers 205. Accordingly, when the pistons 201*b* of the solution distributors 201 are moved to the right, the solutions in the solution distributors 201 are discharged into the receivers 205.

Next, the calculation control unit 36 sends a signal to the driving motor control unit 40 for operating the driving motor 310 to move the supporting block 305 to the right again. Therefore, the solutions are discharged from the corresponding solution distributors 201 into the receivers 205, and at the same time, the pulse signal supplied to the driving motor 310 is fed from the driving motor control unit 40 to the adder 42 which accumulates the number of pulses and sends out the accumulated value to the calculation control unit 36 successively.

The second comparator unit 39 compares the target numbers of pulses of the solution distributors 201 with the number of pulses supplied from the adder 42. When the smallest value PQiR of the target numbers of pulses becomes equal to the number of pulses produced by the adder 42, the signal is transmitted from the second comparator unit 39 to the driving motor control unit 40 for temporarily stopping the rotation of the driving motor 310.

Then, the second comparator unit 39 sends a signal to the three-way solenoid valve control unit 38 for de-energizing the three-way solenoid valve 203-*i* associated with the solution distributor 201-*i* and corresponding to the target number of pulses PQiR. By this operation, the solution in the solution distributor 201-*i* is not discharged into the receiver 205 thereafter, but is discharged into the solution tank 204-*i*.

Moreover, in this operation, since all the three-way solenoid valves 103 associated with the solution distributors 101 are de-energized, the valve passages COM-NO of the three-way solenoid valves 103 are opened to the solution tanks 104. Therefore, even when the flow of the solution through the three-way solenoid valve 203-*i* associated with the solution distributor 201-*i* is changed, the pistons 101*b* are moved backward, namely, are extended from the cylinders 101*a* in accordance with the right-hand movement of the supporting block 305 as mentioned above, so that the solutions in the solution tanks 104 are suctioned into the cylinders 101*a* of the solution distributors 101.

Subsequently, the calculation control unit 36 sends a signal to the driving motor control unit 40 again for operating the driving motor, 310 to move the common base plate 302 to the right. As in the manner mentioned above, the second comparator unit 39 compares the next smallest value of the target number of pulses PQiR' with the number of pulses produce by the adder 42. When the next smallest value PQiR' becomes equal to the number of pulses produced by the adder 42, the rotation of the driving motor 310 is temporarily stopped again and the three-way solenoid valve 203-*i'* corresponding to the next smallest target number of pulses PQiR' is de-energized. By this operation, the solution in the solution distributor 201-*i'* is prevented from being discharged into the receivers 205, and thereafter, the solution is discharged into the solution tank 204-*i'*.

Also, in this operation, since all of the three-way solenoid valves 103 associated with the solution distributors 101 are de-energized, their valve passages COM-NO are opened to the solution tanks 104. Therefore, as mentioned above, even when the direction of the flow of the solution through the three-way solenoid valve 203-*i'* associated with the solution distributor 201-*i'* is changed, the pistons 101*b* are moved backward, namely, are extended from the cylinders 101*a* in accordance with the right-hand movement of the common base plate 302, so that the solutions in the solution tanks 104 are suctioned into the cylinders 101*a* of the solution distributors 101.

In this way, the second comparator unit 39 sequentially switches over the valve passages of the three-way solenoid valves 203, corresponding to the solution distributors 201 opened to the solution tanks 204, as the target number of pulses set in the second memory unit 33 are attained, thereby completing the discharge of the solutions into the receivers 205.

[5-3] SUCTION IN THE SOLUTION DISTRIBUTORS 101: REMAINING SOLUTION DISCHARGE AT THE SOLUTION DISTRIBUTORS 201

The third comparator unit 41 compares the number of pulses supplied from the adder 42 with the number of pulses PmR for the largest piston movement of the solution distributor set in the third memory unit 34, and when the pulse numbers are coincident, the rotation of the driving motor 310 for moving the supporting block 305 to the right is stopped and all of the three-way solenoid valves 203 associated with the solution distributors 201 are de-energized and their valve passages COM-NO are opened to the solution tanks 204. The number of pulses PmR corresponds to the amount of movement of the detection bar 312 required to actuate the limit switch 311*b* at the right side when the pistons 201*b* are completely retracted into the cylinders 201*a* of the solution distributors 201. Therefore, the limit switch 311*b* may be omitted by using the number of pulses PmR corresponding to the largest distance of the movement of the pistons 201*b*.

When the limit switch 311*b* sends out the signal for stopping the rotation of the driving motor 310, the number of injections to be stored in the injection number memory unit 43 is replaced with a value that is one less than the current number of pulses stored in the memory unit 43.

In this way, when the supporting block 305 is moved to the right in FIG. 2 until the limit switch 311*b* is actuated, the first solution mixing operation is completed.

and at the same time, the solution suction operation for all of the solution distributors 101 is completed.

[6] REPETITION OF THE PROCEDURES [1] TO [5]

The automatic solution mixing operation mentioned above will be started again from this stage. That is, the first comparator unit 37 operates the driving motor 310 to move the supporting block 305 to the left for ejecting air bubbles mingled in the solution in all of the solution distributors 101 until the added count value PiL of the number of pulses of the pulse signal supplied to the driving motor 310 becomes equal to the number of pulses PnL stored in the fourth memory unit 35 during the automatic solution mixing operation with respect to the solution distributors 101. In this operation, since every three-way solenoid valve 103 associated with the solution distributors 101 is de-energized, the solutions in the solution distributors 101 are discharged into the solution tanks 104.

Also, in the solution distributors 201, in the manner as mentioned above, the three-way solenoid valves 203 are de-energized with their valve passages COM-NO opened to the solution tanks 204. Accordingly, the pistons 201*b* of the solution distributors 201 are moved backward in accordance with the left-hand movement of the supporting block 305, i.e. common base plate 302, so that the ingredient solutions in the solution tanks 204 are fed into the cylinders 201*a*.

Similarly to the operation mentioned above, when the air bubble ejection operation carried out with the solution distributors 101 has been completed, the second comparator unit 39 sends a signal to the three-way solenoid valve control unit 38 for switching on the three-way solenoid valves 103 associated with the solution distributors 101 having the number of injections n which is equal to or more than 1, thereby opening their valve passages COM-NC for discharging the solutions into the receivers 105. The second comparator unit 39 operates the driving motor 310 to move the supporting block 305 to the left until the number of pulses produced by the adder 42 reaches the smallest number of pulses among the numbers of pulses corresponding to the remaining solution discharge amount.

When the number of pulses produced by the adder 42 reaches the smallest number of pulses mentioned above, the second comparator unit 39 temporarily stops the rotation of the driving motor 310 and switches off the three-way solenoid valves 103 associated with the corresponding solution distributors 101 so that valve passages COM-NO are opened to the solution tanks 104.

The second comparator unit 39 operates the driving motor 310 again to move the supporting block 305 further to the left. Also in this operation, the three-way solenoid valves 203 associated with the solution distributors 201 are held in the off condition, and their valve passages COM-NO are opened to the solution tanks 204. Accordingly, the pistons 201*b* of the solution distributors 201 are moved backward in accordance with the left-hand movement of the supporting block 305, so that the ingredient solutions in the solution tanks 204 are suctioned into the cylinders 201*a*.

In this way, the controller 30 will repeat the operations mentioned above until the solution distributors 101 attain their target discharge amounts. Also, in this operation, the solution distributors 201 will repeat the operations mentioned above corresponding to the solution distributors 101 so as to perform the automatic solution mixing operation.

Thus, in this embodiment of the automatic solution mixing apparatus, by providing a plurality of solution distributors 101 and 201 located on either side of the common base plate 302 on the supporting block 305 which is movable right-to-left with the pistons 101*b* and 201*b* of the solution distributors 101 and 201 connected to the common base plate 302, dual solution mixing operations can be performed in the solution distributors 101 and 201 arranged bilaterally. Therefore, even in the case where a plurality of solution distributors are required, it is not necessary to install many assemblies in which the driving gear of pistons and the solution distributors are combined, and therefore, the automatic solution mixing apparatus need not be large. Moreover, since the accuracy in the movement of the pistons of the solution distributors holds for a number of solution distributors, the solution mixing accuracy also is common to the respective ingredient solutions. Accordingly, the accuracy of proportional distribution ratio between the respective ingredient solutions can be improved.

Moreover, since a stepping motor is utilized as the driving motor, the control of the operation thereof can be performed by controlling the number of pulses of the pulse signal supplied to the driving motor 310, resulting in the elimination of a rotary encoder utilized in a conventional apparatus. Therefore, a cost reduction may be realized together with a simplification of the apparatus because of the elimination of the signal processing system for a rotary encoder, and faults relating to the rotary encoder are obviated. The automatic solution mixing apparatus according to the present invention can attain the same solution mixing accuracy as that in the conventional apparatus without utilizing a rotary encoder.

As described above, according to the present invention, by the provision of pistons of pairs of solution distributors placed face to face each other which move in opposite directions to each other with respect to their respective cylinders by the same amount, while the solution distributors on one side perform the solution distribution, the solution distributors on the other hand can perform solution suction. As a result, a number of solution distribution operations can be performed with a single solution mixing operation without making the automatic solution mixing apparatus large in size. In addition, since the piston movement amounts of the solution distributors on both sides are the same, an identical accuracy for solution distribution may be effected for every distributor.

What is claimed is:

1. An automatic solution mixing apparatus comprising:

at least one pair of solution distributors, each of said distributors including a cylinder and a piston slidably received in said cylinder so as to be reciprocatable relative to said cylinder, and the distributors of each said pair thereof being disposed opposite one another in the apparatus with the pistons thereof extending from their cylinders in opposite directions in the apparatus;

a common base plate interposed between the distributors of each said pair thereof;

a piston coupling mechanism coupling each of said pistons to said common base plate, said coupling mechanism including a forked member fixed to one of a respective said piston and said common base plate, and a joint member fixed to the other of said respective piston and said common base plate, said forked member having a pair of arms each having a recessed portion defining a recess therein, and said joint member being received in the recesses defined in the arms of said forked member and detachably connected to said forked member at the recessed portions of the arms thereof;

a supporting block supporting said common base plate in the apparatus;

a shifting screw operatively connected to said supporting block so as to move said supporting block in the apparatus in respective directions causing the piston of each said solution distributor on one side of said common base plate to extend and the piston of each said solution distributor disposed opposite thereto on the other side of said common base plate to concurrently retract;

first pulley means connected to said shifting screw for transmitting drive to said shifting screw to rotate said screw;

a stepping motor having an output shaft;

second pulley means connected to the output shaft of said stepping motor for transmitting output of the stepping motor; and transmission belt means extending around said first and said second pulley means for transmitting the output of said stepping motor from said second pulley means to said first pulley means to rotate said shifting screw and move said supporting block.

2. An automatic solution mixing apparatus comprising:

at least one pair of solution distributors, each of said distributors including a cylinder and a piston slidably received in said cylinder so as to be reciprocatable relative to said cylinder, and the distributors of each said pair thereof being disposed opposite one another in the apparatus with the pistons thereof extending from their cylinders in opposite directions in the apparatus;

a plurality of solution tanks provided to supply solutions to said solution distributors;

a plurality of solution receivers provided to receive solution from said solution distributors;

three-way solenoid valves operatively interposed between each of said solution distributors and respective ones of the solution tanks and solution receivers associated therewith, each of said three-way solenoid valves moveable between positions at which valve passages of the valves place the solution distributor associated with the valve in open communication with a said solution tank associated with the distributor and with a said solution receiver associated with the distributor, respectively;

a common base plate interposed between the distributors of each said pair thereof;

a piston coupling mechanism coupling each of said pistons to said common base plate, said coupling mechanism including a forked member fixed to one of a respective said piston and said common base plate, and a joint member fixed to the other of said respective piston and said common base plate, said forked member having a pair of arms each having a recessed portion defining a recess therein, and said joint member being received in the recesses defined in the arms of said forked member and detachably connected to said forked member at the recessed portions of the arms thereof;

a supporting block supporting said common base plate in the apparatus;

a shifting screw operatively connected to said supporting block so as to move said supporting block in the apparatus in respective directions causing the piston of each said solution distributor on one side of said common base plate to extend and the piston of each said solution distributor disposed opposite thereto on the other side of said common base plate to concurrently retract;

first pulley means connected to said shifting screw for transmitting drive to said shifting screw to rotate said screw;

a stepping motor having an output shaft;

second pulley means connected to the output shaft of said stepping motor for transmitting output of the stepping motor;

transmission belt means extending around said first and said second pulley means for transmitting the output of said stepping motor from said second pulley means to said first pulley means to rotate said shifting screw and move said supporting block;

solenoid valve control means for feeding signals to said three-way solenoid valves to selectively move said valves to said positions thereof;

calculation means for calculating data corresponding to a predetermined target quantity of solution to be discharged into said receivers from each of said distributors;

driving motor control means operatively connected to said stepping motor for controlling said stepping motor; and control unit means operatively connected to said solenoid valve control means, to said calculation means and to said driving motor control means for controlling said solenoid valve control means and said driving motor control means based on the data calculated by said calculation means.

3. An automatic solution mixing apparatus as claimed in claim 2, wherein said calculation means calculates data of a number of pulses by which said stepping motor will operate to cause the predetermined target quantity of solutions to be discharged from each of said solution distributors, by executing the following equations:

$$PQiL = POiL \times QiL,$$

and $$PQiR = POiR \times QiR$$

wherein PQiL is the number of pulses by which said stepping motor will operate to cause a predetermined quantity of solution to be discharged from a respective one of the solution distributors on one side of said common base plate, PQiR is the number of pulses by which said stepping motor will operate to cause a predetermined quantity of solution to be discharged from a respective one of the solution distributors on the other side of said common base plate, POiL is the number of pulses by which said stepping motor will operate to cause a unit amount of solution to be discharged from the respective one of the solution distributors on said one side of said common base plate, POiR is the number of pulses by which said stepping motor will operate to cause a unit amount of solution to be discharged from the respective one of the solution distributors on said other side of said common base plate, QiL is said predetermined target quantity of solution to be discharged from the respective one of said solution distributors on said one side of said common base plate, and QiR is said predetermined target quantity of solution to be discharged from the respective one of said solution distributors on said other side of said common base plate.

* * * * *